Oct. 26, 1965  W. D. HUSTON  3,213,688
PRESSURE GAGE
Filed April 19, 1962
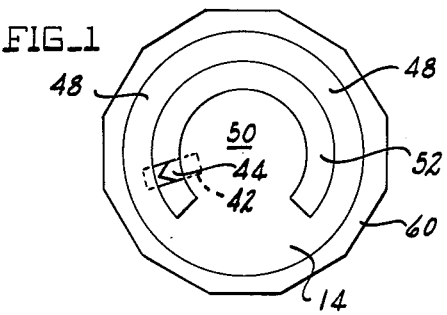
FIG_1
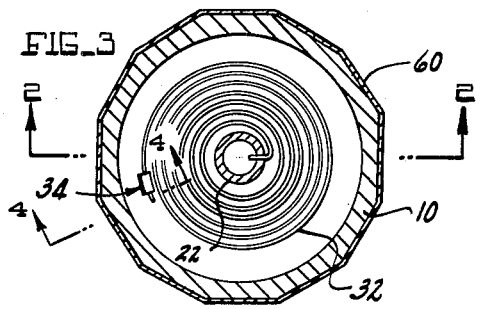
FIG_3
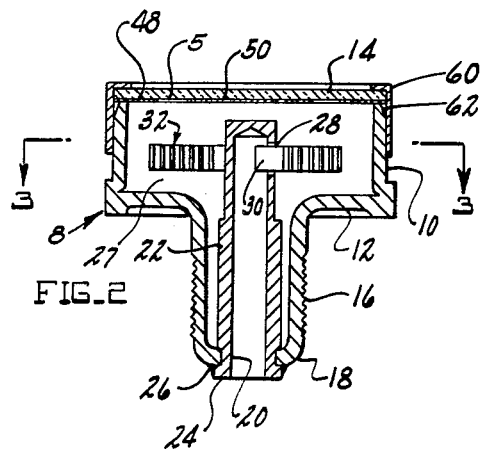
FIG_2
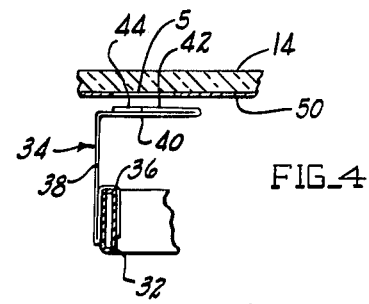
FIG_4
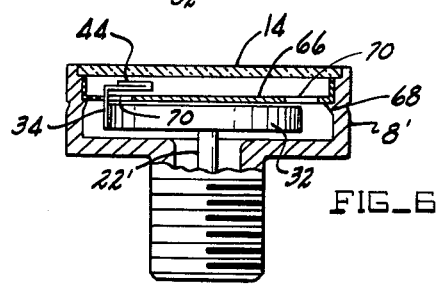
FIG_6
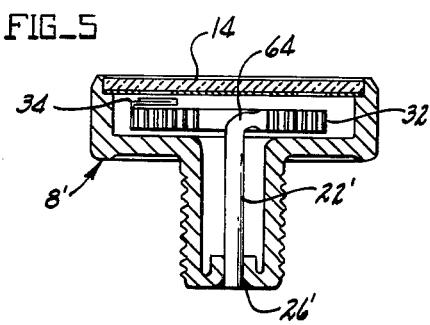
FIG_5
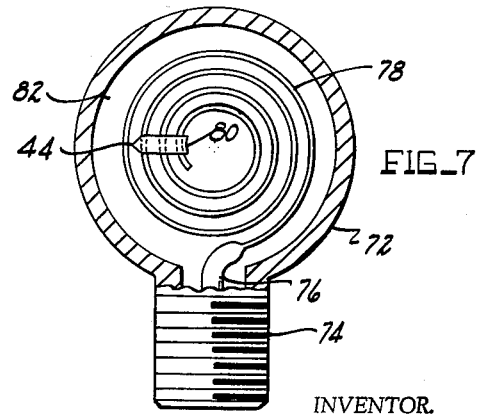
FIG_7
INVENTOR.
WILLIAM D. HUSTON
BY
Andrew K. Jones
his ATTORNEY

United States Patent Office 3,213,688
Patented Oct. 26, 1965

3,213,688
PRESSURE GAGE
William D. Huston, Rochester, N.Y., assignor to American Radiator & Standard Sanitary Corporation, New York, N.Y., a corporation of Delaware
Filed Apr. 19, 1962, Ser. No. 188,787
1 Claim. (Cl. 73—411)

This invention relates to fluid pressure gages of the type which are operated by pressure changes in a line, tank or thermostatic bulb.

One object of the invention is to provide a pressure gage which can be formed with a minimum number of component parts.

A second object is to provide a pressure gage which can be formed as a small size device.

A further object of the invention is to provide a pressure gage which can be easily calibrated.

A still further object of the invention is to provide a pressure gage having a pressure sensing and indicating element which moves in a substantial distance arc around the gage axis so as to give a precise and easily read pressure indication.

A further object is to provide a pressure gage which operates without friction-produced errors.

Other objects of this invention will appear from the following description and appended claims, reference being had to the accompanying drawings forming a part of this specification wherein like reference characters designate corresponding parts in the several views.

In the drawings:

FIGURE 1 is a top plan view of one embodiment of the invention;

FIG. 2 is a sectional view of the FIG. 1 embodiment taken on line 2—2 in FIG. 3;

FIG. 3 is a sectional view taken on line 3—3 in FIG. 2;

FIG. 4 is an enlarged fragmentary sectional view taken on line 4—4 in FIG. 3;

FIG. 5 is a sectional view taken through a second embodiment of the invention;

FIG. 6 is a sectional view taken through a third embodiment of the invention; and FIG. 7 is a sectional view taken through a fourth embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in detail to the drawings, particularly FIG. 2, there is shown a tubular gage housing 8 comprising an annular side wall 10, a base or end wall 12, and an upper partially transparent end wall 14 which serves as an indicia wall as will be apparent hereinafter. Extending outwardly axially from wall 12 is an externally threaded mounting sleeve or fitting 16, the terminal portion of which is turned inwardly at 18 to engage the reduced diameter section 20 of an upstanding fluid pressure conduit or post structure 22. The adjacent end portion 24 of conduit 22 is staked onto the inwardly extending sleeve portion 18, and a ring 26 of a solder or the like is applied to secure conduit 22 in the sleeve.

The upper end area of the conduit side wall is located centrally within the gage housing chamber 27 and is provided with a rectangular opening 28 to receive the end portion 30 of a pressure responsive eleemnt 32. In the FIG. 2 device the pressure responsive element comprises a spiral Bourdon tube of oblong or flattened cross section disposed with end portion 30 thereof sealed in opening 28 by solder or the like. As shown in FIG. 2, the Bourdon tube extends in a plane generally at right angles to the axis of conduit 22, and as shown in FIG. 3 the Bourdon tube is provided with a multiplicity of convolutions spiraling radially outwardly from the conduit so that the outermost convolution is located adjacent chamber side wall 10.

As above noted, the Bourdon tube is of oblong cross section. Due to the small scale on which FIG. 2 is taken the cross section is not readily apparent in that figure; however FIG. 4 shows the general cross section in detail, and it will be seen therefrom that the longest cross sectional dimension of the tube extends normal to the plane of the tube spiral so that a large multiplicity of tube spiral convolutions can be suspended from conduit 22 without axial displacement of the spiral convolutions, as by reason of gravity or vibrational effects. The extreme outer end of the Bourdon tube is suitably sealed so that pressure increase in conduit 22 tends to unwind the Bourdon tube, thereby causing the terminal end of the tube to move in a clockwise direction as seen in FIG. 3.

At or adjacent the terminal end of the Bourdon tube there is mounted an indicator element designated generally by numeral 34. Preferably the indicator element is formed of thin gage strip stock, and is provided with a generally U-shaped yoke or saddle portion 36 for its mounting on the Bourdon tube. Its upstanding portion 38 is turned inwardly to provide a lower horizontal portion 40 and an upper horizontal portion 42, the end area of which is given a pointer configuration 44. The pointer portion is preferably given a distinctive color such as bright red. Preferably the pointer portion is disposed within the profile perimeter of the Bourdon tube as shown in FIG. 4, whereby to permit use of a relatively small diameter gage housing.

It will be noted that the FIG. 2 gage is not provided with an indicia or dial plate below pointer portion 44. Instead indicia markings are provided directly on wall 14, as by means of lithographing the undersurface thereof. The indicia preferably includes an outer peripheral opaque area 48, a central opaque area 50, and an intervening ring-like transparent area 52. Transparent area 52 is concentric with respect to the axis of conduit 22 and is in registry with the path of motion of pointer 44 so that during movement of pointer 44 the position thereof is at all times visible to the observer. The appearance to the viewer is that the pointer is moving around a pivot shaft located on the axis of the gage, although of course there is no actual pivot shaft. The opaque areas 48 and 50 may be distinctively colored in different portions thereof, and suitable numerical or alphabetical indicia may be applied thereon to indicate the conditions sensed by the Bourdon tube, as for example temperature or pressure, depending on whether the gage is used to sense vessel pressure or thermostatic bulb pressure.

The gage may be partially calibrated before or after the sub-assembly of conduit 22 and Bourdon tube 32 is assembled into the gage housing 8. In making this partial calibration the indicator element 34 is initially disposed so that its yoke portion 36 has a friction grip on the Bourdon tube 32, and a range of test pressures applied to conduit 22 to determine whether the indicator element is located on that part of the tube which will give a desired indicator element travel. The indicator element may be adjusted along the length of the Bourdon tube to the point thereon which provides the desired range of movement, after which the indicator element may be cemented to the tube in its adjusted position. The U-shaped saddle portion 36 provides two opposed clamping wall surfaces which engage opposite surfaces on the flattened Bourdon tube cross section to provide a firm location of the indicator element on the tube during the calibrating operation.

With the assembly of conduit 22 and Bourdon tube 32 located in housing 8, the lithographed indicia wall 14 and bezel 60 may be inserted onto the end of the gage housing, as by pressing the bezel over the tapered surfaces 62 of the side wall and onto the parallel surfaces thereof. Preferably the bezel and housing side wall 10 are formed with a plurality of external flats thereon to permit the gage to be mounted in a threaded opening with a wrench or the like. Prior to complete insertion of the bezel onto wall 10 the indicia wall 14 is rotated so that the markings thereon are correctly correlated with pointer 44.

Referring now to FIG. 5, there is shown a gage which is in many respects similar to the FIG. 2 gage. Accordingly similar reference numerals are utilized wherever applicable. In the FIG. 5 embodiment of the invention the pressure responsive element comprises a Bourdon tube 32 which is formed integrally with a conduit portion 22'. Preferably conduit portion 22' is of circular cross section; therefore the formation of the pressure responsive element is accomplished by starting from circular cross section tube stock, flattening a length thereof corresponding to portion 32, forming a right angle bend 64, and finally forming the Bourdon tube spiral convolutions. The pressure responsive element may be retained in gage housing 8' by means of a solder ring 26'. The remaining components of the gage, including the indicator element 34 and the indicia wall 14, may be formed similarly to the aforementioned corresponding elements in the FIG. 2 embodiment; accordingly a description of these elements at this point is not deemed necessary. The functioning and operation of the FIG. 5 gage is the same as the functioning and operation of the FIG. 2 gage.

Both the FIG. 1 and FIG. 5 forms of the invention are characterized by parts simplicity and small size. For example these embodiments can be formed with a diameter across the gage housing wall 10 of approximately one inch so that the gage can be disposed in most installations where space is at a premium.

It will be noted that in each instance pointer 44 is disposed adjacent the outer perimeter of the gage housing and that it enjoys a substantial distance arcuate travel in the operating range of the gage. This is in contrast to some of the prior art gages wherein a very small movement of a pressure-responsive element is relied on to give pressure indication; in such prior art gages the responsive element moves through a very small distance, and the movement is magnified through the use of linkages or the like. Such linkages provide a structure of relatively high cost and high percent error per given manufacturing tolerance variation.

Referring now to the FIG. 6 embodiment, the indiciaed opaque areas thereof are formed on a dial plate 66 which is suitably supported in housing 8', as by struck out wall portions 68. Wall 14 is transparent over its entire area so that the markings on plate 66 are visible therethrough. The plate is formed with a ring-like slot 70 for accommodating movement of the indicator element 34. Calibration and operation of the FIG. 6 embodiment is the same as the FIG. 1 and FIG. 5 embodiments.

The FIG. 7 embodiment comprises a tubular gage housing 72 having an externally threaded mounting sleeve 74 extending radially of the housing axis. In this form of the invention the fluid pressure conduit 76 is suitably mounted in sleeve 74 and is connected with the outermost convolution of the spiral Bourdon tube 78. The innermost convolution of the Bourdon tube carries an indicator element 80, preferably by means of a yoke arrangement similar to that shown at 36 in FIG. 4. In this instance however the pointer portion 44 extends radially outwardly of the coil convolution so that its tip is near the outer periphery of the housing chamber 82.

The viewing wall corresponding to wall 14 in FIGS. 2, 5 and 6 is not shown in FIG. 7. However the FIG. 7 embodiment is provided with such a wall; it may be partially opaque to act as an indicia dial plate as in FIG. 1, or it may be fully transparent as in FIG. 6, in which case a separate dial plate is provided behind pointer portion 44, as in the FIG. 6 embodiment. In the FIG. 7 embodiment the indicator element enjoys a fairly long arcuate travel due to its position near the housing periphery and the employment of a Bourdon tube having a large number of spiral convolutions. Preferably in each embodiment a Bourdon tube having at least three convolutions is employed. Also, in each instance the tube cross section is preferably oblong or flattened with the longest cross sectional dimension thereof extending normal to the tube spiral plane.

In all illustrated forms of the invention the multi-convolution spiral tube is arranged centrally within the housing chamber and centered about the chamber axis so as to make best use of the housing volume, i.e., there is little unoccupied or unused space. The invention is especially useful where parts simplicity, compactness and cost are of major importance.

It will be understood that the invention is capable of being utilized in various forms, and that modifications from the illustrated forms may be resorted to without departing from the spirit of the invention as set forth in the appended claim.

I claim:

In a pressure gage: a housing defining a generally cylindrical chamber; a fluid pressure supply conduit projecting into the chamber on its axis; a uni-planar multi-convolution spiral Bourdon tube connected with the pressure supply conduit for winding and unwinding movements thereabout; said Bourdon tube having a flattened cross section with the longest cross sectional dimension thereof extending normal to the tube spiral plane; dial means overlying the Bourdon tube and located in a plane parallel to the tube winding-unwinding plane, whereby the Bourdon tube is concealed from view by the dial means; means mounting the dial means for rotational adjustment relative to the fluid pressure supply conduit whereby the Bourdon tube and dial means can enjoy different relative positions during calibration of the gage; and an indicator element carried directly on the Bourdon tube for substantial distance arcuate movement in response to pressure changes within the tube; said indicator element comprising a saddle portion seating on an outer convolution of the Bourdon tube, an upstanding portion extending from the saddle portion generally parallel to the housing axis, and a pointer portion extending radially inwardly from the upstanding portion in a plane adjacent the dial means plane to read against said dial means; said indicator saddle portion comprising opposed walls constituting clamping surfaces engaging opposite surfaces on the Bourdon tube, whereby the indicator element is self-supporting on the Bourdon tube; the self-supporting mount of the indicator element on the tube permitting the indicator element to be adjusted along the tube during calibration of the gage.

References Cited by the Examiner

UNITED STATES PATENTS

| 829,551 | 8/06 | Spencer | 73—411 |
|---|---|---|---|
| 1,116,938 | 11/14 | Sheldon | 73—411 X |
| 2,123,395 | 7/38 | Antrim | 73—415 |
| 2,813,427 | 11/57 | Lindsay et al. | 73—411 |

FOREIGN PATENTS

| 741,030 | 12/32 | France. |
|---|---|---|
| 545,543 | 6/42 | Great Britain. |

RICHARD C. QUEISSER, *Primary Examiner.*

ROBERT EVANS, *Examiner.*